United States Patent [19]

Grant et al.

[11] Patent Number: 5,414,512
[45] Date of Patent: May 9, 1995

[54] METHOD AND APPARATUS FOR VIEWING A SHEAROGRAHIC IMAGE

[75] Inventors: Ralph M. Grant; Forrest Wright, both of Rochester, Mich.

[73] Assignee: Grant Engineering, Inc., Rochester, Mich.

[21] Appl. No.: 29,163

[22] Filed: Mar. 10, 1993

[51] Int. Cl.⁶ ............................................. G01B 9/02
[52] U.S. Cl. .................................. 356/35.5; 356/347; 356/348; 356/353
[58] Field of Search ..................... 356/35.5, 347, 348, 356/345, 353; 73/800

[56] References Cited

U.S. PATENT DOCUMENTS

| | | | |
|---|---|---|---|
| 4,139,302 | 2/1979 | Hung et al. | 356/32 |
| 4,349,901 | 9/1982 | Howe | 356/354 |
| 4,425,039 | 1/1984 | Grant | 356/35.5 |
| 4,620,223 | 10/1986 | Haskell et al. | 358/107 |
| 4,690,552 | 9/1987 | Grant et al. | 356/35.5 |
| 4,702,594 | 10/1987 | Grant | 356/35.5 |
| 4,783,055 | 11/1988 | Widen et al. | 356/348 |
| 4,887,899 | 12/1989 | Hung | 356/35.5 |
| 5,004,345 | 4/1991 | Hung | 356/353 |
| 5,007,738 | 4/1991 | Grant | 356/347 |
| 5,041,726 | 8/1991 | Chang et al. | 356/347 |
| 5,091,776 | 2/1992 | Tyson, II | 356/353 |
| 5,094,528 | 3/1992 | Tyson, II et al. | 356/353 |
| 5,121,148 | 6/1992 | Windeler et al. | 354/152 |
| 5,257,089 | 10/1993 | Stetson | 356/353 |
| 5,307,139 | 4/1994 | Tyson, II et al. | 356/35.5 |
| 5,327,217 | 7/1994 | Kanai et al. | 356/353 |

FOREIGN PATENT DOCUMENTS 2-543299 9/1984 Germany ........................... 356/35.5

OTHER PUBLICATIONS

"Measuring The Quality Through the Use of Holographic and Shearographic (L-Ray ®) Nondestructive Tire Testing", Ralph Grant, Oct. 3, 1991, American Chemical Society.

*Primary Examiner*—Rolf Hille
*Assistant Examiner*—Minhloan Tran
*Attorney, Agent, or Firm*—Gifford, Krass, Groh, Sprinkle, Patmore, Anderson & Citkowski

[57] ABSTRACT

A shearogram representing an object and including a fringe pattern arising from a change in local surface strain brought about by an applied stress during the making of the shearogram is reconstructed by a special viewer. The viewer holds the shearogram transparency adjacent to a focusing lens having an optical axis, and projects off-axis white light through the lens and transparency to a focal plane where the resulting diffraction pattern is viewed directly on a screen or by a video camera and display monitor. By projecting the light from different positions around the axis a first position can be found which tunes the diffraction efficiency to an optimum for the best view of fringe patterns and a second position can be found which eliminates the fringe patterns and shows only a photographic image of the object. The light source is a rotatable disk with two apertures containing light diffusing elements which are illuminated by a lamp. The disk is rotated to change the projection angle.

15 Claims, 1 Drawing Sheet

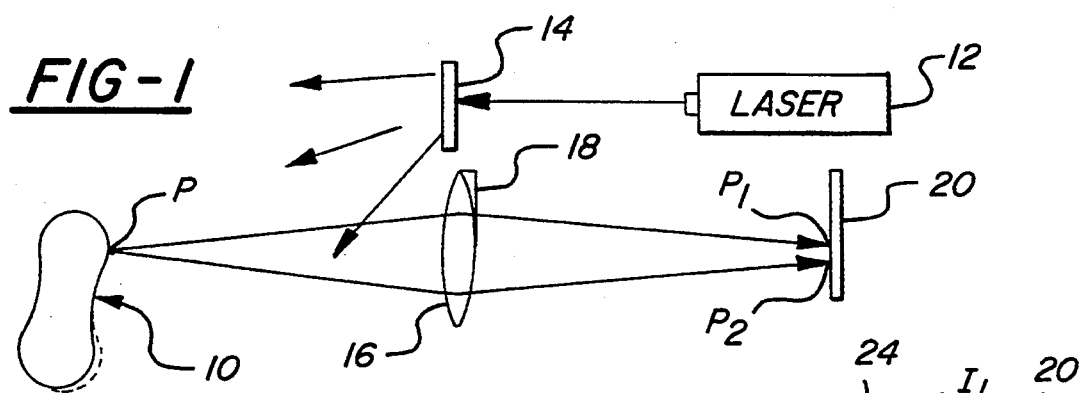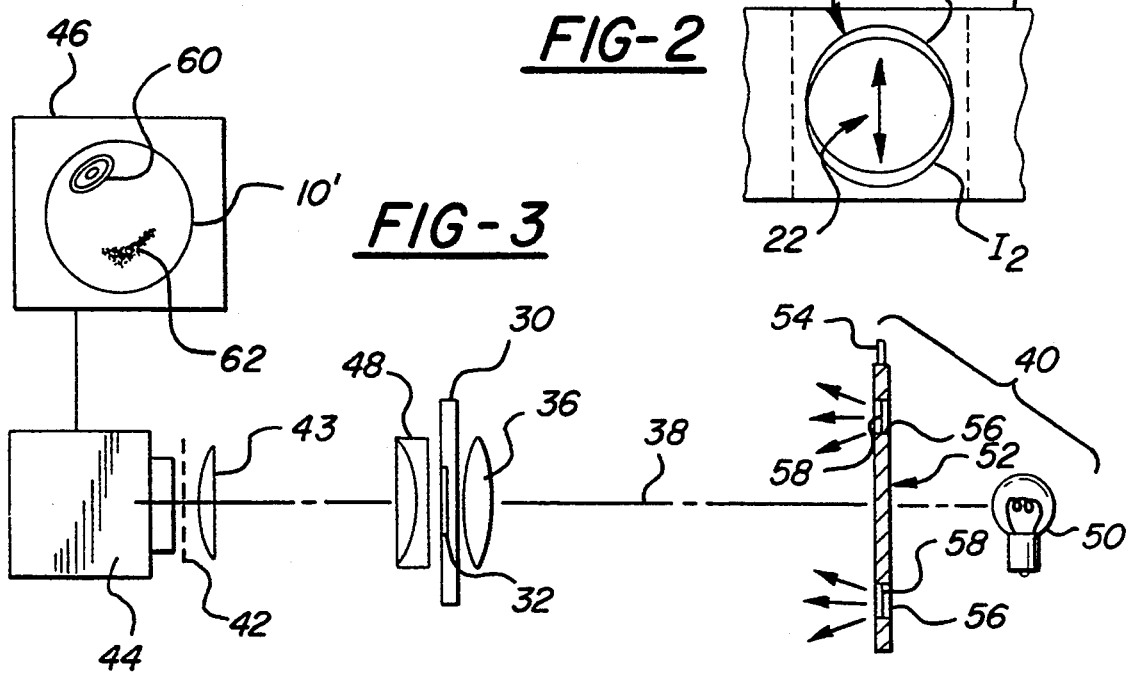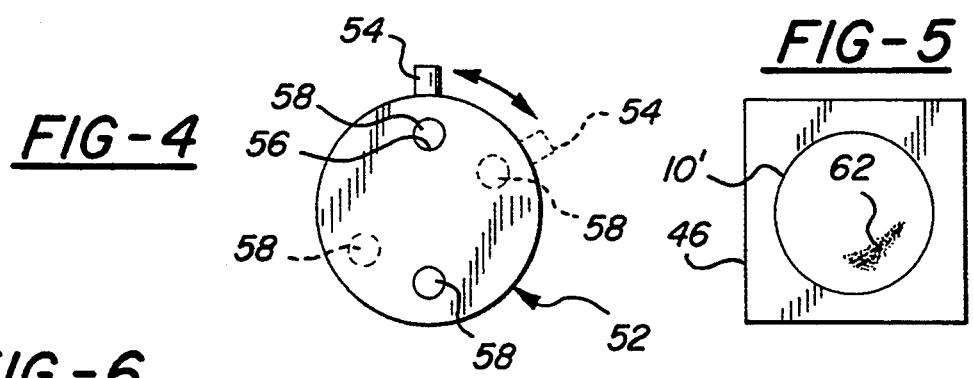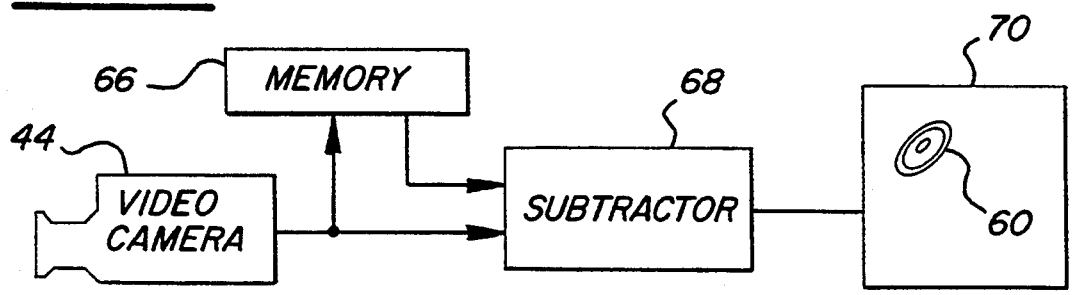

METHOD AND APPARATUS FOR VIEWING A SHEAROGRAHIC IMAGE

FIELD OF THE INVENTION

This invention relates to the detection of strain in objects upon application of stress and particularly to a method and apparatus for making and viewing shearographic images of such objects.

BACKGROUND OF THE INVENTION

Conventional holographic interferometry is known for measuring the surface displacement of articles under test. That technology requires a very precise set-up of optical equipment. A laser is used to illuminate an object and to illuminate a photographic film which is further illuminated by light reflected from the object, and interference of the direct and reflected light at the film produces an interference pattern containing much information about the surface position. By double exposing the film to such light before and after some deformation or movement of the surface, and developing the film, a hologram is produced. Upon reconstruction interferences fringes reveal the amount of surface movement between exposures.

Due to a number of drawbacks, another measurement technique became desirable, especially in production facilities. The conventional holography is very sensitive to vibration or other movement of the whole object so that special care is necessary. Also the equipment requires very accurate alignment. In addition, a high degree of coherence of the laser light is needed. Another type of interferometry has become more practical. Shearography or shearing interferometry is now widely used, particularly for such tasks as inspecting automotive and aircraft tires.

Shearography entails exposing an object to laser light and making two simultaneous exposures of a film by passing the reflected light through two different optical paths to the film, each path having a focusing lens so that two slightly displaced images of the object are obtained to establish a speckle interference pattern. By stressing the object and repeating the exposure process, a double or multiple exposure is made which, when developed, reveals fringe patterns in areas of local surface strain. The method is relatively insensitive to rigid body displacement and requires a relatively low coherence laser beam. The U.S. Pat. No. 4,139,302 to Hung et al, entitled "Method and Apparatus for Interferometric Deformation Analysis", describes the shearography method, the apparatus used to make a shearogram transparency, and a viewer apparatus for viewing the transparency to observe the fringe pattern.

After a shearogram is made, it is desirable to view it in an optimal manner for analysis of the test results. To this end, white light is projected through a transform lens and the shearogram transparency to image the fringes on a focal plane. Typically, a video camera views this image and displays it on a monitor. The placement of the white light source is determined for theoretically optimum fringe production in accordance with the ideal geometry of the shearogram generating apparatus. However, a number of practical matters force departure from ideal geometry and from ideal photographic conditions, and as a result the viewing device may be unable to deliver the fringed images as clearly and unambiguously as desired.

In the case of tire inspection, for example, inspection for ply separation and other inner defects is made by observing, via shearographic optics, deformation of the inside surface of the tire carcass as ambient pressure is changed. In a production facility the rate of testing and variations in individual tire characteristics does not leave unlimited time to set up each tire for consistent photography in the test station. Moreover, the sizes and physical characteristics of tires in successive tests may vary dramatically, and it is not desired to setup the system at each change. If the tire is not centered in the test station, there will be different object distances involved from image to image and even within each image. Other differences arise such as the color of the tire or its viscoelastic stretch or as the optics are tilted up or down to view different portions of the tire carcass. A fixed viewer geometry has no way of compensating for departures from ideal conditions in the making of the shearogram. Such compensation is desirable whenever it can result in a clearer, higher quality and more detailed image of the pattern.

Because a shearogram comprises a set of fringes superimposed on a photographic image of the object, another source of imaging problems is the color of the tire surface or variations of color due to the effects of mold release material on the surface color, for example, or the presence of debris inside the tire. Suspicious artifacts in the shearogram image may appear to be the result of a tire defect when, in fact, they are caused by coloration or harmless foreign material. It is thus desirable to be able to inspect the tire surface in the absence of the fringe patterns to discern whether the tire surface appearance gave rise to a fringe-like artifact or, alternatively, to remove the photographic portion of the image and leave only the fringe pattern.

SUMMARY OF THE INVENTION

Because of the problems set forth above, it sometimes seems desirable to generate another shearogram and alter the conditions to gather more information or to get better information. However, it has been found that generally the necessary information is already contained in the shearogram. By constructing and operating the shearogram viewer in a particular manner the problems resulting from the appearance of the object or of the setup used in the shearogram generation or variations in the tires general behavior under stress can be overcome.

It is here proposed to design a shearogram viewer which has the conventional Fourier transform lens adjacent to the shearogram and a special light source which illuminates the shearogram through the lens to produce an image in a focal plane, and to view the image by a video camera for display of the shearographic information. The special light source is located off the optical axis of the viewer by an amount which depends on the geometry of the shearogram generation optics and the viewer optics. Preferably, to obtain better illumination of the shearogram and the resultant image, the light source actually comprises two sources equally spaced from the optical axis and on opposite sides of the axis. The light source is angularly movable about the axis to illuminate the shearogram from different angles relative to the shear direction.

Typically, the best light source position for optimum viewing of fringes in a shearogram is in the shear plane; that is, the light source is spaced from the axis in the shear direction of the shearogram. It has been found, however, that due to non-ideal conditions during the generation of the shearogram, the fringe image is enhanced by moving the reconstruction light source a few degrees out of the shear plane. The best position of the source for optimum fringe resolution is determined for each shearogram by observing the reconstructed image while the source is rotated about the axis.

When the fringe image is displayed in the manner just described, a photographic image of the object is superimposed on the fringe image. This can result in some confusion where the object has coloration or other surface condition which might be interpreted as a fringe arising from object deformation. However, by rotating the light source to a position 90° from the shear plane, the fringe pattern disappears and only the photographic image remains. Then the observer can immediately discern which image details are fringes resulting from variation in local shear strain on the surface of the object and which are surface characteristics. As an alternative to viewing and comparing two separate images, the photographic image obtained with the light source 90° from the shear plane is electronically subtracted from the composite image to result in an image of fringe patterns only.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an optical diagram illustrating apparatus for making a shearogram;

FIG. 2 is an illustration of a shearogram made by the apparatus of FIG. 1;

FIG. 3 is a shearogram viewer according to the invention;

FIG. 4 is a front view of the light source of the viewer of FIG. 3;

FIG. 5 is an illustration of a display without fringes made from a shearogram by the viewer of FIG. 3; and FIG. 6 is a schematic diagram of an electronic system for obtaining a fringe pattern only from a shearogram, according to the invention.

DESCRIPTION OF THE INVENTION

The generation of a shearogram is illustrated in FIG. 1. Various types of apparatus have been proposed for this purpose, but the version shown here is preferred and illustrates the principle of operation. An object 10, which is subject to localized shear strain as a result of an applied stress as indicated by dashed lines, is illuminated by coherent light. For this purpose a laser 12 projects a coherent light beam onto a light diffusing element 14 such as a disk of opal which irradiates the object 10. A focusing lens 16 and prismatic wedge 18 combination views the illuminated side of the object and focuses light reflected from the object onto film 20. This optic arrangement, which is further described in the above-mentioned U.S. Pat. No. 4,139,302, comprises a shearographic camera and is like a conventional camera except for the prism. The prism 18 covers only one half of the lens (the upper half, as shown here) so that two slightly displaced images are formed on the film 20. Thus the point P on the object is imaged as point $P_1$ by light passing through the upper half of the lens 16 and the prism 18, and as point $P_2$ by light passing through the lower half of the lens 16 only, the two image points being displaced vertically in this example. If the film is developed at this point, the displaced images $I_1$ and $I_2$ (for an object 10 having a circular boundary) appear as shown in FIG. 2, being shifted in the direction of the arrow 22 which is termed the shear direction or shear axis. Because of the overlap of two images, an interference of the light occurs in the image. Instead of developing the film at this stage, the object 10 is stressed and a second exposure is made to superimpose a second interference pattern on the film which is then developed to reveal interference fringes corresponding to regions undergoing variations in shear strain as observed on the surface of the object. This developed double or multiple exposure is the shearogram 24 and will still have the appearance of two displaced images as in FIG. 2. By viewing and analyzing the fringe patterns, the location and amount of shear strain can be determined. In a tire, for example, ply separation or poor adhesion can be identified and quantified.

The apparatus of FIGS. 3 and 4 is used to view the shearogram 24. A film holder 30 has a slit 32 for receiving the film 20 bearing the shearogram 24 and holding it adjacent to a focusing or Fourier transform lens 36, the axis 38 of the lens defining the optical axis of the viewer. Light from a source assembly 40 illuminates the shearogram 24 through the lens 36 and focuses the image on a focal plane 42 and may be viewed directly at the plane 42 if a screen were placed there. A plano-convex lens 43 near the focal plane matches the image to a camera. While a conventional film camera is sometimes used it is generally preferred to view the image with a video camera 44 which displays the image on a monitor 46. Since the image resulting from the lens 36 and the shearogram 24 has a spherical wavefront, it does not focus well on a focal plane. Accordingly, a field flattener lens 48 is placed adjacent the film holder to produce a substantially flat or planar wavefront at the focal plane 42 to improve the image.

The light source assembly 40 comprises a lamp 50 in front of a carrier or disk 52 which is mounted to rotate about the optical axis 38, and has a knob 54 for manual adjustment of the disk angle of rotation. Two apertures 56 in the disk 52 are equally spaced diametrically opposite the axis 38. Each aperture contains a light diffusing element 58 so that each such element 58 becomes a light source for projecting off-axis light through the lens 36 and the shearogram. The size of each aperture or source 58 may be very small, like a pinpoint, and the light then must be intense to provide adequate illumination. Each source 58 does, however, produce a hot spot in the image and may be distracting to the viewer if the hot spot is intense. It is preferred to use a larger diameter source 58 and a less intense light to diminish the intensity of the hot spots. The size is empirically determined. In a preferred system for 35 mm film having a 16 to 28 mm focal length focusing lens 36, a ⅜ inch diameter source is suitable. While a pin point source yields the highest resolution, the larger source diminishes the resolution only very slightly. The sources 58 are each spaced from the axis by an amount which best reveals the fringe pattern of the shearogram. The optimum spacing or separation is also determined empirically. The separation of the two sources depends on the overall geometry of the viewer as well as on the f-stop of the lens 16 in the shearography camera. For example, for the preferred system mentioned above it has been determined that for an f-stop of 5.6 a source separation of 2.5 inches is suitable, and for an f-stop of 8 a source separation of 1.75 inches is suitable. The source disk may, if desired, contain only one source 58. The resulting image is still usable, but one side is darker than the other and less clear. Two sources provide definitely better illumination of the image. The rotatable disk 52 allows movement of the source or sources 58 relative to the shear plane of the shearogram and maintains each source at a constant radial distance from the axis.

In FIG. 3 the display 46 represents the photographic image of the object superimposed on the first order diffraction pattern obtained when the viewer is optimally tuned by rotary adjustment of the disk 52. The display depicts an image 10' of the object 10, a fringe pattern 60 which reveals a change in a local surface position between the two exposures of the shearogram, and a dark spot 62. It is difficult to determine without additional information whether the dark spot 62 is a sort of diffraction pattern caused by surface displacement or whether it results from the coloration of the object 10 or some debris or other foreign matter on the object. By turning the disk to position each source 90° to the shear plane, the fringes are tuned out leaving only the plain image 10' of the object as shown in FIG. 5. In this case the dark spot 62 appears as part of the object image and thus is not a fringe pattern. The observer then can conclude that only the fringe pattern 60 is the result of stress in the object 10.

In applications where the image contains many artifacts, either fringes or object markings, it may be desirable to view the fringes alone rather than separately viewing the object image with and without fringes. This can be accomplished, as shown in FIG. 6, by electronically subtracting the plain object image from the composite image. The video camera 44 output is coupled to a memory 66 and to a subtractor 68, and the subtractor output is coupled to another display 70. In use, the viewer is tuned to eliminate the fringes and the plain object image is recorded in the memory 66. Then the viewer is tuned to reveal the composite image of fringes and object, and the subtractor 68 subtracts the plain object image in memory from the composite to obtain the fringe pattern 60 alone.

It will be apparent that the improvements in the viewer makes possible the method of making a transparency of an object by or multiple exposing a film with a shearographic camera for different object stress conditions, and developing the film to produce a shearogram transparency having a given shear direction; viewing the transparency by projecting off-axis light through a Fourier transform lens and through the transparency to a focal plane so that an image of the object and a fringe pattern are produced on the focal plane; adjusting the direction of the light relative to the shear direction to optimize the fringe pattern; and adjusting the direction of the light relative to the shear direction to substantially eliminate the fringe pattern to reveal a plain image of the object.

The embodiments of the invention in which an exclusive property or privilege is claimed are defined as follows:

1. Apparatus for reconstructing a shearographic image of an object from a transparency formed by a double exposure of a film by a shearographic camera to reveal a composite image of the object and fringe patterns representing deformation of the object between the exposures, the shearographic image having a shear axis, the apparatus comprising:

an optical system having an axis, a light source spaced laterally from the axis, a lens for focusing the light source onto a focal plane, and means for holding a shearographic transparency adjacent the lens for illumination by the light source; and means for rotating the light source around the axis to change the angle of light incidence on the transparency relative to the shear axis, wherein the fringe pattern intensity varies from a maximum value to a minimum value as the angle of incidence changes.

2. The invention as defined in claim 1 wherein the means for moving the light source around the axis includes means to maintain the light source at a constant distance from the axis.

3. The invention as defined in claim 1 wherein the optical system includes a camera on the optical axis for viewing the image on the focal plane.

4. The invention as defined in claim 3, wherein the means for moving the light source is adjustable to yield a plain image of the object without fringe patterns;
the camera is a video camera; and
the apparatus further includes electronic means coupled to the video camera output for subtracting the plain image of the object from the image composite containing fringe patterns to yield an image of fringe patterns only.

5. Apparatus for reconstructing an image of an object from a shearographic transparency formed by a double exposure of a film of an object subject to deformation to reveal an image of the object and fringe patterns representing deformation of the object between the exposures, comprising:

an optical system having an axis and means for holding a shearographic transparency, means for illuminating the transparency, and a lens on the axis for passing light through the transparency onto a focal plane;

the means for illuminating the transparency comprises a light source, a carrier between the source and the transparency which is rotatable about the optical axis, and at least one off-axis light diffusing element on the carrier exposed to the light source for illuminating the transparency;

whereby the fringe patterns formed on the focal plane vary in accordance with the rotation of the carrier about the axis and the carrier is adjustable to yield a plain image of the object without fringe patterns.

6. The invention as defined in claim 5 wherein the at least one light diffusing element comprises two diffusing elements equally and oppositely spaced from the axis.

7. The invention as defined in claim 5 wherein the optical system includes a camera on the optical axis for viewing the image on the focal plane.

8. The invention as defined in claim 7, wherein the camera comprises a video camera:
the apparatus further including electronic means coupled to the video camera output for subtracting the plain image of the object from the image containing fringe patterns to yield an image of fringe patterns only.

9. A method of detecting shear strain in an object by shearography comprising:

making a transparency of an object by double exposing a film with a shearographic camera for different object stress conditions, and developing the film, the transparency having a shear direction;

aligning a transform lens and the transparency along an optical axis;

viewing the transparency by projecting off-axis light though said transform lens and through the transparency to a focal plane wherein an image of the object and a fringe pattern are produced on the focal plane;

rotating the projected light about the optical axis to change the shear direction to optimize the fringe pattern; and contining to rotate the projected light about the optical axis to change the direction of the light relative to the shear direction to substantially eliminate the fringe pattern to reveal a plan image of the object.

10. The invention as defined in claim 9 wherein the step of projecting off-axis light includes positioning two sources of light spaced equally and oppositely from the axis; and the steps of adjusting each comprise rotating the two sources about the axis.

11. The invention as defined in claim 9 further including electronically displaying the image produced on the focal plane.

12. The invention as defined in claim 9 further including electronically subtracting the plain image from the image with a fringe pattern to yield a fringe pattern only; and displaying the fringe pattern only.

13. Apparatus for reconstructing a shearographic image of an object from a transparency formed by a double exposure of a film by a shearographic camera to reveal a composite image of the object and fringe patterns representing deformation of the object between the exposures, the shearographic image having a shear axis, the apparatus comprising:

an optical system having an axis, a light source spaced laterally from the axis, a lens for focusing the light source onto a focal plane, means for holding a shearographic transparency adjacent the lens for illumination by the light source, and a video camera on the optical axis for viewing the image on the focal plane;

means for moving the light source around the axis to change the angle of light incidence on the transparency relative to the shear axis, whereby thefringe pattern intensity depends on the angle of incidence, said light source being adjustable to yield a plain image of the object without fringe patterns; and electronic means coupled to the video camera output for subtracting the plain image of the object from the image composite containing fringe patterns to yield an image of fringe patterns only.

14. A method of detecting shear strain in an object by shearography comprising:

making a transparency of an object by double exposing a film with a shearographic camera for different object stress conditions, and developing the film, the transparency having a shear direction;

viewing the transparency by projecting off-axis light from two sources of light spaced equally and oppositely from an axis though a transform lens and through the transparency to a focal plane wherein an image of the object and a fringe pattern are produced on the focal plane;

rotating the two light sources about the axis to change the direction of the light relative to the shear direction so as to optimize the fringe pattern; and contining to rotate the light source about the axis so as to substantially eliminate the fringe pattern to reveal a plan image of the object.

15. The invention as defined in claim 14 further including electronically subtracting the plain image from the image with a fringe pattern to yield a fringe pattern only; and displaying the fringe pattern only.

* * * * *